United States Patent
Bruch et al.

(10) Patent No.: US 11,740,207 B2
(45) Date of Patent: Aug. 29, 2023

(54) ULTRASONIC PROBE ALIGNMENT USING ULTRASOUND SIGNALS

(71) Applicant: Baker Hughes Holdings LLC, Houston, TX (US)

(72) Inventors: Tobias Bruch, Cologne (DE); Ralf Ratering, Bruhl (DE)

(73) Assignee: Baker Hughes Holdings LLC, Houston, TX (US)

(*) Notice: Subject to any disclaimer, the term of this patent is extended or adjusted under 35 U.S.C. 154(b) by 94 days.

(21) Appl. No.: 17/521,184

(22) Filed: Nov. 8, 2021

(65) Prior Publication Data

US 2022/0178882 A1 Jun. 9, 2022

Related U.S. Application Data

(60) Provisional application No. 63/123,177, filed on Dec. 9, 2020.

(51) Int. Cl.
*G01N 29/06* (2006.01)
*G01N 29/28* (2006.01)
(Continued)

(52) U.S. Cl.
CPC ......... *G01N 29/0645* (2013.01); *G01N 29/28* (2013.01); *G01S 15/08* (2013.01);
(Continued)

(58) Field of Classification Search
CPC .... G01N 29/0645; G01N 29/28; G01N 29/07; G01N 29/2468; G01N 29/11;
(Continued)

(56) References Cited

U.S. PATENT DOCUMENTS

| 5,777,230 A | 7/1998 | Vandervalk |
|---|---|---|
| 8,661,906 B2 | 3/2014 | Meinert et al. |

(Continued)

FOREIGN PATENT DOCUMENTS

WO 2018056820 A2 3/2018

OTHER PUBLICATIONS

S. Keren, et al., "Flexible Ultrasonic Phased-Array Probe," Tsinghua Science and Technology, 9(5), Oct. 2004, pp. 574-577.

(Continued)

*Primary Examiner* — Jacques M Saint Surin
(74) *Attorney, Agent, or Firm* — Mintz Levin Cohn Ferris Glovsky and Popeo, PC

(57) ABSTRACT

An ultrasonic inspection system includes an ultrasonic probe and an analyzer. The probe includes a flexible delay line and an ultrasonic transducer array at a first delay line end. A second delay line end can contact a target. The analyzer can receive ultrasonic echoes from the ultrasonic transducers representing amplitude of ultrasonic signals reflected from the target as a function of time from transmission. The analyzer determines a maximum amplitude of the echoes received by each transducer, scale the maximum amplitudes based upon a greatest maximum amplitude, and bin the scaled maximum amplitudes. The analyzer assigns each bin a color and generate a C-scan based upon the scaled amplitudes. Each C-scan pixel can correspond to at least one transducer, and the relative position of each C-scan pixel can correspond to the relative position of the ultrasonic transducer represented by the pixel. Each pixel can be displayed with its assigned color.

18 Claims, 13 Drawing Sheets

(51) Int. Cl.
  *G01S 15/08* (2006.01)
  *G06F 3/14* (2006.01)
(52) U.S. Cl.
  CPC ......... *G06F 3/14* (2013.01); *G01N 2291/023* (2013.01); *G01N 2291/0289* (2013.01); *G01N 2291/106* (2013.01)
(58) Field of Classification Search
  CPC ........ G01N 29/04; G01N 29/24; G01N 29/48; G01N 2291/023; G01N 2291/015; G01N 2291/106; G01N 2291/0289; G01N 2291/011; G01N 2291/2638; G01S 15/08; G06F 3/14
  USPC .......................................................... 73/625
  See application file for complete search history.

(56) References Cited

U.S. PATENT DOCUMENTS

| | | | |
|---|---|---|---|
| 8,839,673 B2 * | 9/2014 | Rasselkorde | G01N 29/043 |
| | | | 73/625 |
| 9,037,419 B2 | 5/2015 | Na et al. | |
| 9,372,174 B2 | 6/2016 | Bond-Thorley et al. | |
| 9,435,770 B2 | 9/2016 | Lamberton et al. | |
| 9,517,049 B2 | 12/2016 | Nozaki et al. | |
| 9,689,844 B2 | 6/2017 | Holmes et al. | |
| 9,791,421 B2 | 10/2017 | Fassi | |
| 10,267,913 B2 | 4/2019 | Smith et al. | |
| 10,639,008 B2 | 5/2020 | Lindekugel et al. | |
| 10,838,573 B2 * | 11/2020 | Ratering | G01N 29/24 |
| 11,435,868 B2 * | 9/2022 | Li | G06F 3/0486 |
| 2015/0377839 A1 * | 12/2015 | Jack | G01N 29/4472 |
| | | | 702/33 |
| 2022/0374129 A1 * | 11/2022 | Li | G06F 3/04883 |

OTHER PUBLICATIONS

Yamada, et al., "Measurement of Probe Angle for Ultrasound Evaluation of Articular Cartilage Using 'Rise-to-Peak Time'" Journal of Biomechanical Science and Engineering, vol. 5, No. 5, pp. 615-624 (2010).

* cited by examiner

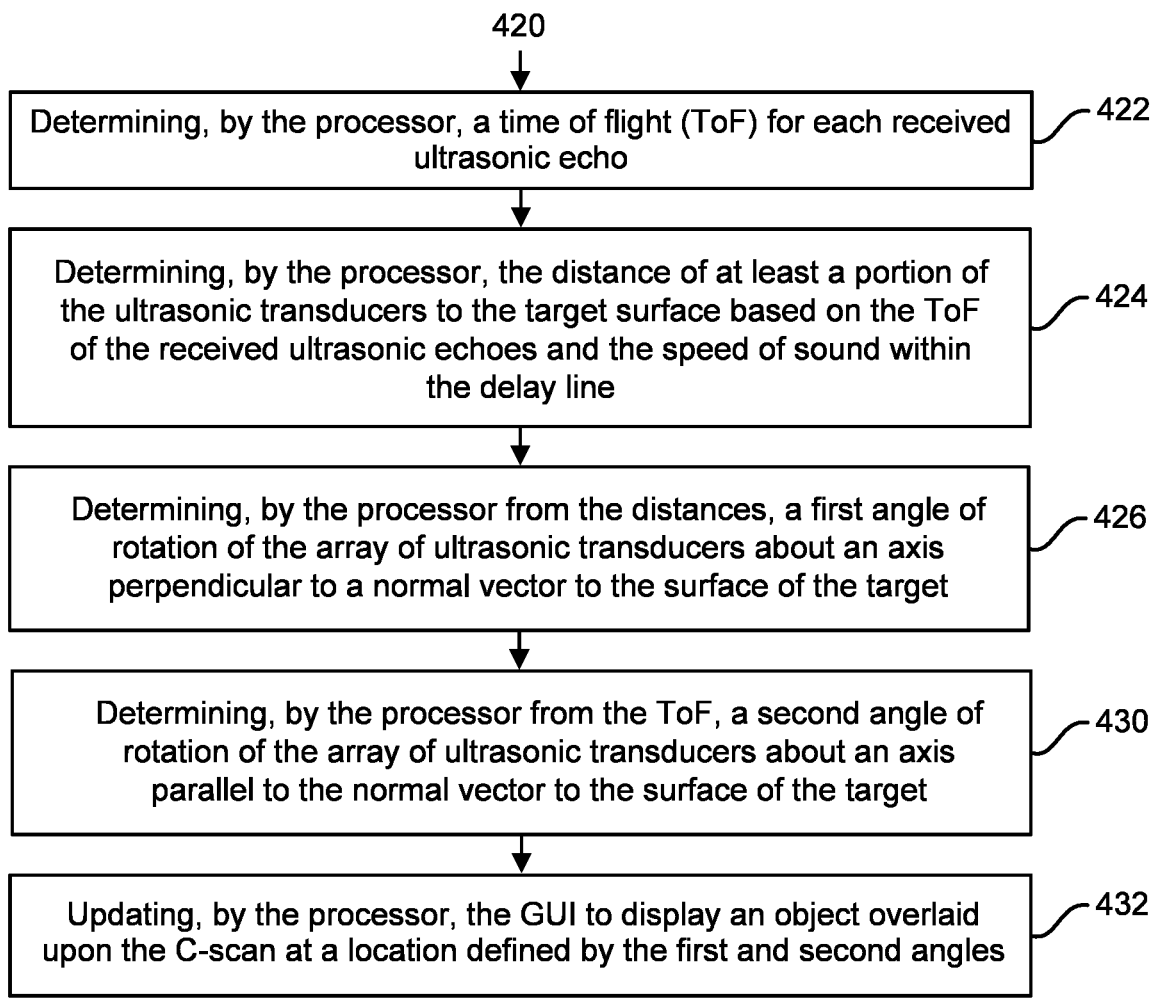
FIG. 4 (con't)

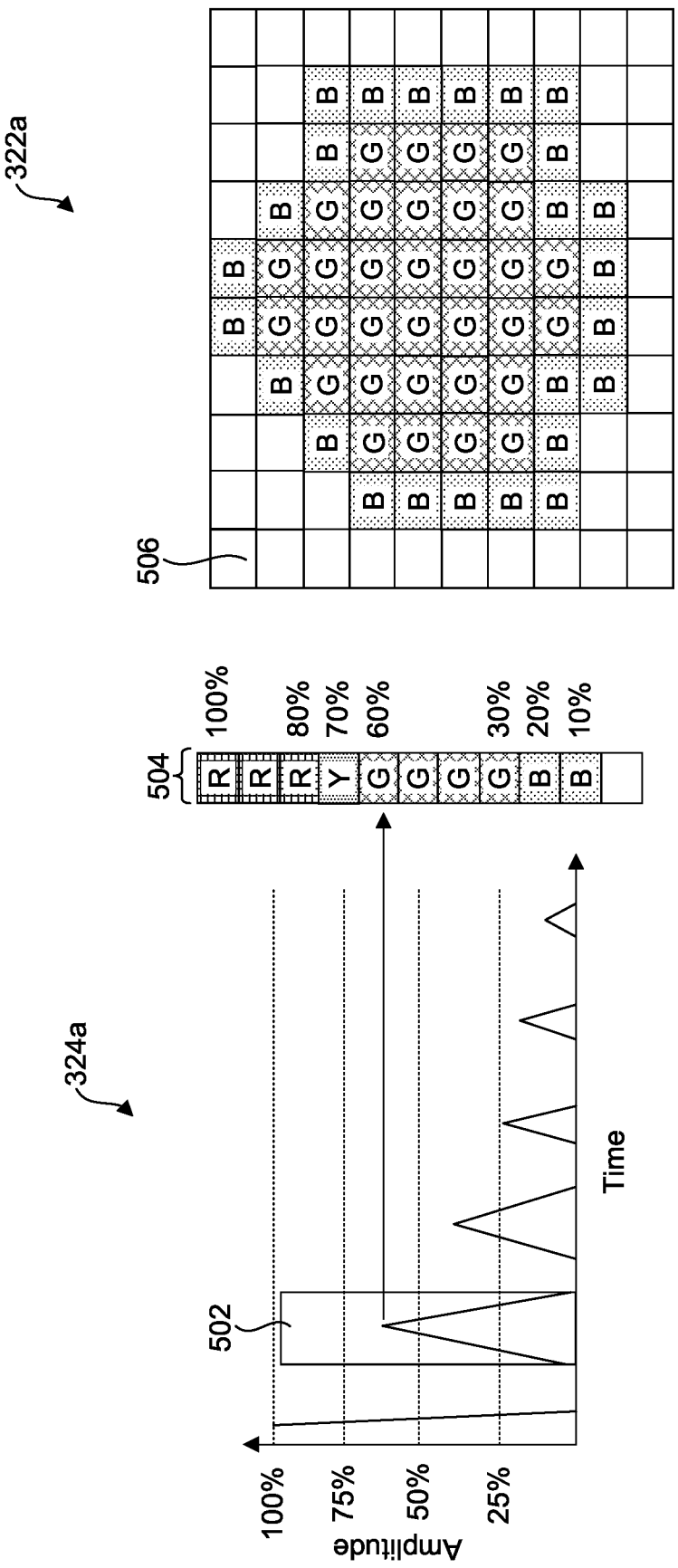

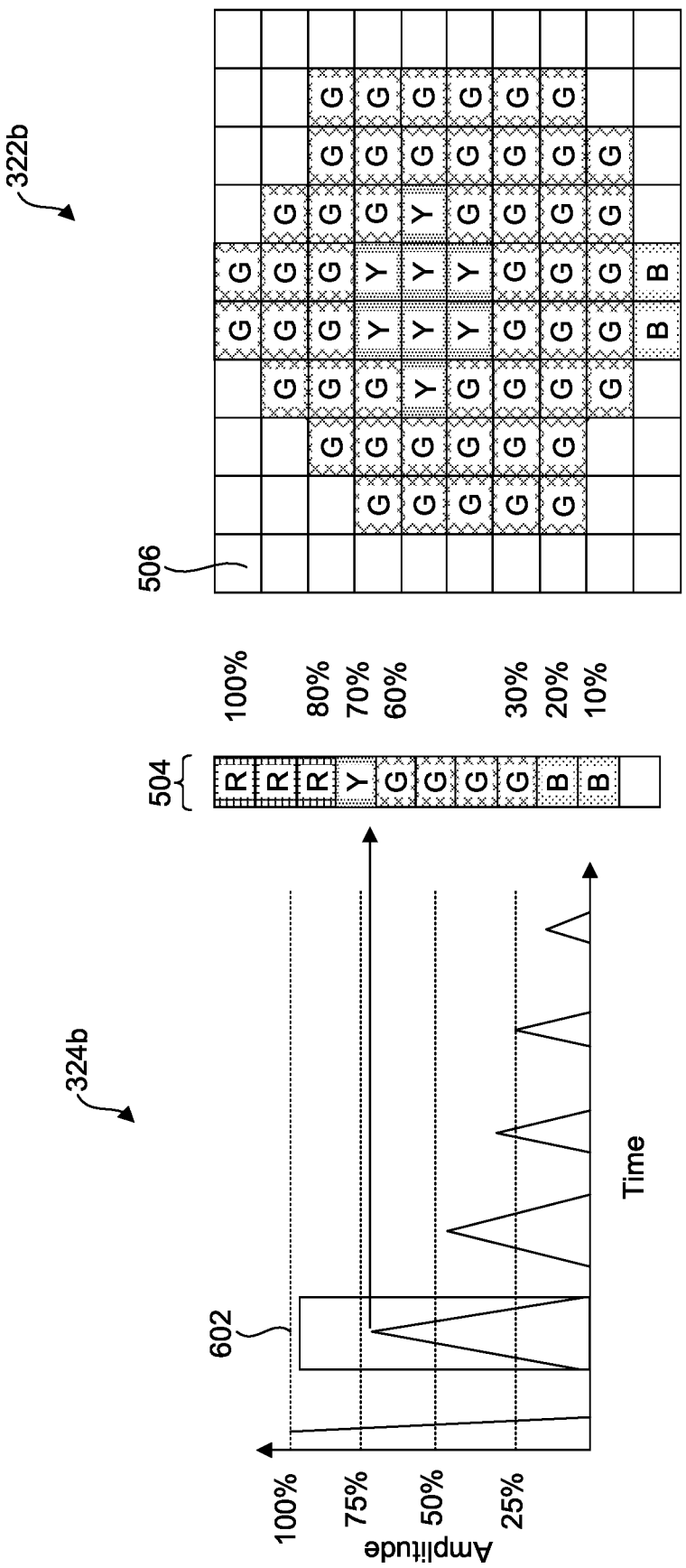

ULTRASONIC PROBE ALIGNMENT USING ULTRASOUND SIGNALS

CROSS-REFERENCE TO RELATED APPLICATIONS

This application claims the benefit of U.S. Provisional Patent Application No. 63/123,177, filed on Dec. 9, 2020, entitled "Ultrasonic Probe Alignment Using Ultrasound Signals," the entirety of which is incorporated by reference.

BACKGROUND

Non-destructive testing (NDT) is a class of analytical techniques that can be used to inspect characteristics of a target, without causing damage, to ensure that the inspected characteristics of the target satisfy required specifications. NDT can be useful in industries that employ structures that are not easily removed from their surroundings (e.g., pipes or welds) or where failures would be catastrophic. For this reason, NDT can be used in a number of industries such as automotive, aerospace, power generation, oil and gas transport or refining.

Ultrasonic inspection is one type of non-destructive testing technique. An ultrasonic transducer can be used to emit ultrasonic signals (sound waves) that travel into the inspected target. Ultrasonic echoes resulting from reflection of the transmitted ultrasonic signals from boundaries within the inspected part (e.g., defects and outer boundaries) can be subsequently detected by the ultrasonic transducer. Properties of the reflected ultrasonic echoes can be measured by the ultrasonic transducer (e.g., amplitude, time of flight, etc.) and subsequently analyzed to identify characteristics of defects detected within the inspected part, such as location and size.

SUMMARY

In general, the amplitude of an ultrasonic wave reflected from a boundary within the inspected part depends on the angle of the incidence of the ultrasonic wave on the boundary. In order to facilitate detection of ultrasonic echoes, it can be desirable to configure an ultrasonic testing system such that the amplitude of transmitted ultrasonic signals results in ultrasonic echoes signal that have a relatively large amplitude. If the amplitude of ultrasonic echoes is too low, they can be difficult to detect.

One approach to maximize the amplitude of ultrasonic echoes is to direct ultrasonic signals at an angle of approximately 0 degrees to a normal vector of the surface of the target or the reflecting boundary, referred to as normal incidence. Under conditions of normal incidence, ultrasonic echoes reflected at a boundary within the target can return along the path of the emitted ultrasonic signals, while transmitted ultrasonic signals can continue along the same direction as the emitted ultrasonic signals. That is, substantially no refraction occurs. Because no refraction occurs, the maximum sound pressure is reemitted from the boundary in the direction of incidence of the ultrasonic wave, resulting in maximum detected amplitude of the reflected ultrasonic echoes. In contrast, if a refraction occurs, less sound amplitude is reemitted in the direction of incidence of the ultrasonic wave, resulting in a lower detected amplitude of the reflected ultrasonic echoes.

FIG. 1 illustrates one exemplary embodiment of an ultrasonic probe 100 configured to facilitate normal incidence of emitted ultrasonic signals. As shown, the ultrasonic probe 100 is in contact with a target 102 having a contoured surface 104 and a reflector 108 embedded within. The ultrasonic probe 100 includes ultrasonic transducers 106 and a flexible delay line 110. The ultrasonic transducers 106 can be in the form of a two-dimensional array separated from one another by a predetermined distance.

The delay line 110 is a material interposed between the ultrasonic transducers 106 and the target 102 in which the speed of sound is relatively low. As a result, a precise delay can be introduced between the time at which the ultrasonic signal is emitted and the time at which resultant ultrasonic echoes are detected by the ultrasonic transducers 106. Delay lines are commonly employed for detection of flaws near the surface of the target 102, as the introduced time delay facilitates distinguishing between ultrasonic echoes resulting from reflection of ultrasonic signals at near sub-surface flaws reflection and other ultrasonic echoes resulting from reflection at the surface of the target 102.

The elastic modulus of a solid, or in the case of a liquid the compression modulus, is a material property that characterizes the degree of deformation of the material in response to an applied force. The flexible delay line 110 can possess an elastic modulus that allows it to deform elastically and conform to contours 104 on the surface of the target 102. As compared to more rigid delay lines, the flexible delay line 110 can reduce tilting of the ultrasonic probe 100 and facilitate orientation of the ultrasonic probe 100 for normal incidence between a direction of propagation 112 of the emitted ultrasonic signal (e.g., a beam axis) and the surface of the target surface 104.

In contrast, if the direction of propagation 112 of the emitted ultrasonic signal and the surface of the target surface 104 are not aligned approximately perpendicular to one another but at a non-zero angle $\alpha$ (rotation about the y-axis), the transmitted ultrasonic signal is refracted at an angle $\beta$, as shown in FIG. 2. Under this angle $\beta$, the reflector 108 is not "seen" because the ultrasonic signal is not reflected back to the ultrasonic transducers 106. Refraction similarly occurs when the ultrasonic probe 100 is oriented at a non-zero angle $\gamma$ (e.g., rotation about the z-axis).

Thus, to maximize the amplitude of ultrasonic echoes, it is desirable that $\alpha$ and $\beta$ are approximately zero. However, due to the high degree of freedom of the ultrasonic probe 100 having the flexible delay line 110, it can be time-consuming to achieve this alignment.

Accordingly, there exists an ongoing need for improved systems and methods for alignment of ultrasonic probes.

In an embodiment, a method of aligning an ultrasonic probe is provided. The method can include positioning an ultrasonic probe in contact with a target. The ultrasonic probe can include a flexible delay line extending from a first end to a second end and an array of ultrasonic transducers positioned at the first end of the flexible delay line. The second end of the flexible delay line can contact the target. The method can also include transmitting, by the array of ultrasonic transducers, respective ultrasonic signals. The method can further include receiving, by the array of ultrasonic transducers, ultrasonic echoes representing amplitude of the ultrasonic signals reflected from the target as a function of time from transmission. The method can additionally include determining, by a processor, a maximum amplitude of the ultrasonic echoes received by each ultrasonic transducer. The method can also include scaling, by the processor, the determined maximum amplitude received by each ultrasonic transducer based upon a greatest determined maximum ultrasonic echo amplitude. The method can further include binning, by the processor, each of the scaled maximum ultrasonic echo amplitudes. The method can additionally include assigning, by the processor, a color to each bin. The method can also include generating, by the processor, a Graphical User Interface (GUI) including a C-scan based upon the scaled ultrasonic echo amplitudes. Each pixel of the C-scan can correspond to at least one ultrasonic transducer. The relative position of each pixel of the C-scan can corresponds to the relative position of the ultrasonic transducer represented by the pixel. Each pixel can be displayed with the color assigned to the scaled ultrasonic echo received by the pixel. The method can further include \rendering, within a display, the generated GUI.

In an embodiment, the method can further include determining, by the processor, a time of flight for at least a portion of the received ultrasonic echoes corresponding to reflection from the target surface to reach its ultrasonic transducers. The method can also include determining, by the processor, the distance of at least a portion of the ultrasonic transducers to the target surface based on the time of flight of the received ultrasonic echoes and the speed of sound within the flexible delay line. The method can additionally include determining, by the processor from the ultrasonic transducer distances, a first angle of rotation of the array of ultrasonic transducers about an axis perpendicular to a normal vector to the surface of the target. The method can also include determining, by the processor from the time of flight, a second angle of rotation of the array of ultrasonic transducers about an axis parallel to the normal vector to the surface of the target. The method can further include updating, by the processor, the GUI to display an object overlaid upon the C-scan at a location defined by the first and second angles.

In an embodiment, the flexible delay line can be formed from a solid and has an elastic modulus within the range from about 0.01 GPa to about 0.2 GPa.

In an embodiment, the delay line can be formed from a liquid and has a compression modulus within the range from about 0.8 GPa to about 4.5 GPa.

In an embodiment, the liquid can be an ultrasonic couplant.

In another embodiment, an ultrasonic inspection system is provided and it can include an ultrasonic probe and a processing unit. The ultrasonic probe can include a flexible delay line extending from a first end to a second end and an array of ultrasonic transducers positioned at the first end of the flexible delay line. The second end of the flexible delay line can contact the target. The processing unit can include an analyzer having at least one processor. The at least one processor can be configured to receive, from the array of ultrasonic transducers, ultrasonic echoes representing amplitude of the ultrasonic signals reflected from the target as a function of time from transmission. The at least one processor can also be configured to determine a maximum amplitude of the ultrasonic echoes received by each ultrasonic transducer. The at least one processor can be further configured to scale the determined maximum amplitude received by each ultrasonic echoes based upon a greatest determined maximum amplitude. The at least one processor can be additionally configured to bin each of the scaled maximum amplitudes. The at least one processor can also be configured to assign a color to each bin. The at least one processor can be further configured to generate a Graphical User Interface (GUI) including a C-scan based upon the scaled ultrasonic echoes. Each pixel of the C-scan can corresponds to at least one ultrasonic transducer. The relative position of each pixel of the C-scan can correspond to the relative position of the ultrasonic transducer represented by the pixel. Each pixel can be displayed with the color assigned to the scaled ultrasonic echo received by the pixel. The at least one processor can additionally be configured to render, within a display, the generated GUI.

In an embodiment, the at least one processor can be further configured to determine a time of flight for at least a portion of the received ultrasonic echo corresponding to reflection from the target surface to reach its ultrasonic transducers. The at least one processor can be additionally configured to determine the distance of at least a portion of the ultrasonic transducers to the target surface based on the time of flight of the received ultrasonic echoes and the speed of sound within the flexible delay line. The at least one processor can be further configured to determine, from the ultrasonic transducer distances, a first angle of rotation of the array of ultrasonic transducers about an axis perpendicular to a normal vector to the surface of the target. The at least one processor can also be configured to determine, from the time of flight, a second angle of rotation of the array of ultrasonic transducers about an axis parallel to the normal vector to the surface of the target. The at least one processor can be further configured to update the GUI to display an object overlaid upon the C-scan at a location defined by the first and second angles.

In an embodiment, the flexible delay line can be formed from a solid and has an elastic modulus within the range from about 0.01 GPa to about 0.2 GPa.

In an embodiment, the flexible delay line can be a formed from a liquid and has a compression modulus within the range from about 0.8 GPa to about 4.5 GPa.

In an embodiment, the liquid can be an ultrasonic couplant.

In another embodiment, an ultrasonic probe is provided and it can include a flexible delay line and a processing unit. The flexible delay line can extend from a first end to a second end and an array of ultrasonic transducers positioned at the first end of the flexible delay line. The second end of the flexible delay line can contact the target. The processing unit can include an analyzer having at least one processor. The at least one processor can be configured to receive, from the array of ultrasonic transducers, ultrasonic echoes representing amplitude of the ultrasonic signals reflected from the target as a function of time from transmission. The at least one processor can also be configured to determine a time of flight for at least a portion of the received ultrasonic echoes corresponding to reflection from the target surface to reach its ultrasonic transducers. The at least one processor can be further configured to determine the distance of at least a portion of the ultrasonic transducers to the target surface based on the time of flight of the received ultrasonic echoes and the speed of sound within the flexible delay line. The at least one processor can also be configured to determine, from the ultrasonic transducer distances, a first angle of rotation of the array of ultrasonic transducers about an axis perpendicular to a normal vector to the surface of the target. The at least one processor can be further configured to determine, from the time of flight, a second angle of rotation of the array of ultrasonic transducers about an axis parallel to the normal vector to the surface of the target. The at least one processor can be additionally configured to update the GUI to display an object overlaid upon the C-scan at a location defined by the first and second angles.

In an embodiment, the flexible delay line can be formed from a solid and has an elastic modulus within the range from about 0.01 GPa to about 0.2 GPa.

In an embodiment, the flexible delay line can be a formed from a liquid and has a compression modulus within the range from about 0.8 GPa to about 4.5 GPa.

In an embodiment, the liquid can be an ultrasonic couplant.

In another embodiment, a method of aligning an ultrasonic probe is provided. The method can include positioning an ultrasonic probe in contact with a target. The ultrasonic probe can include a flexible delay line extending from a first end to a second end and an array of ultrasonic transducers positioned at the first end of the flexible delay line. The second end of the flexible delay line can contact the target. The method can also include transmitting, by the array of ultrasonic transducers, respective ultrasonic signals. The method can further include receiving, by the array of ultrasonic transducers, ultrasonic echoes representing amplitude of the ultrasonic signals reflected from the target as a function of time from transmission. The method can additionally include determining, by a processor, a time of flight for at least a portion of the received ultrasonic echoes corresponding to reflection from the target surface to reach its ultrasonic transducers. The method can also include determining, by the processor, the distance of at least a portion of the ultrasonic transducers to the target surface based on the time of flight of the received ultrasonic echoes and the speed of sound within the flexible delay line. The method can further include determining, by the processor from the ultrasonic transducer distances, a first angle of rotation of the array of ultrasonic transducers about an axis perpendicular to a normal vector to the surface of the target. The method can additionally include determining, by the processor from the time of flight, a second angle of rotation of the array of ultrasonic transducers about an axis parallel to the normal vector to the surface of the target. The method can also include updating, by the processor, the GUI to display an object overlaid upon the C-scan at a location defined by the first and second angles.

In an embodiment, the delay line can be formed from a solid and has an elastic modulus within the range from about 0.01 GPa to about 0.2 GPa.

In an embodiment, the delay line can be formed from a liquid and has a compression modulus within the range from about 0.8 GPa to about 4.5 GPa.

In an embodiment, the liquid can be an ultrasonic couplant.

DESCRIPTION OF DRAWINGS

These and other features will be more readily understood from the following detailed description taken in conjunction with the accompanying drawings, in which:

FIG. 5A is a plot illustrating an A-scan of ultrasonic echo amplitude as a function of time for an ultrasonic transducer of an array of ultrasonic transducers when the ultrasonic probe is at an initial position;

FIG. 5B is a plot illustrating a C-scan of maximum A-scan amplitudes for the array of ultrasonic transducers when the ultrasonic probe is at the initial position;

FIG. 6A is a plot illustrating an A-scan of ultrasonic echo amplitude as a function of time for an ultrasonic transducer when the ultrasonic probe is at a first position;

FIG. 6B is a plot illustrating a C-scan of maximum A-scan amplitudes for the array of ultrasonic transducers when the ultrasonic probe is at the first position;

It is noted that the drawings are not necessarily to scale. The drawings are intended to depict only typical aspects of the subject matter disclosed herein, and therefore should not be considered as limiting the scope of the disclosure.

DETAILED DESCRIPTION

When performing ultrasonic testing, it can be desirable to direct the ultrasonic signal approximately perpendicular to the surface of the target being tested in order to increase the strength (amplitude) of the detected reflected signal. Ultrasonic probes can employ flexible delay lines to better conform to curved target surfaces. However, it can be challenging to orient these ultrasonic probes to direct the ultrasonic signal approximately perpendicular to the surface of the target. Accordingly, improved systems and methods for aligning ultrasonic probes are provided. As discussed in greater detail below, ultrasonic echoes representing reflection of ultrasonic waves from the surface of a target are measured. Color-coded, two-dimensional plots of measured amplitude of ultrasonic echoes as a function of position can be generated and displayed in a graphical user interface (GUI). An operator can use these plots to receive real-time feedback that moving the ultrasonic probe has on the measured amplitudes to facilitate finding optimal inclination alignment of the ultrasonic probe. Beneficially, with such C-scans, an operator does not need to review the A-scan for signal optimization. Additionally, a simple and intuitive display in the form of a "water-bubble" like graphic can be generated and overlaid upon the two-dimensional plots to provide further specific guidance as to the direction in which to move the optimize the probe alignment.

Embodiments of the present disclosure are presented in the context of flexible ultrasonic probes. However, it can be understood that the disclosed embodiments can be employed with any configuration of ultrasonic probe without limit.

Figure 1:
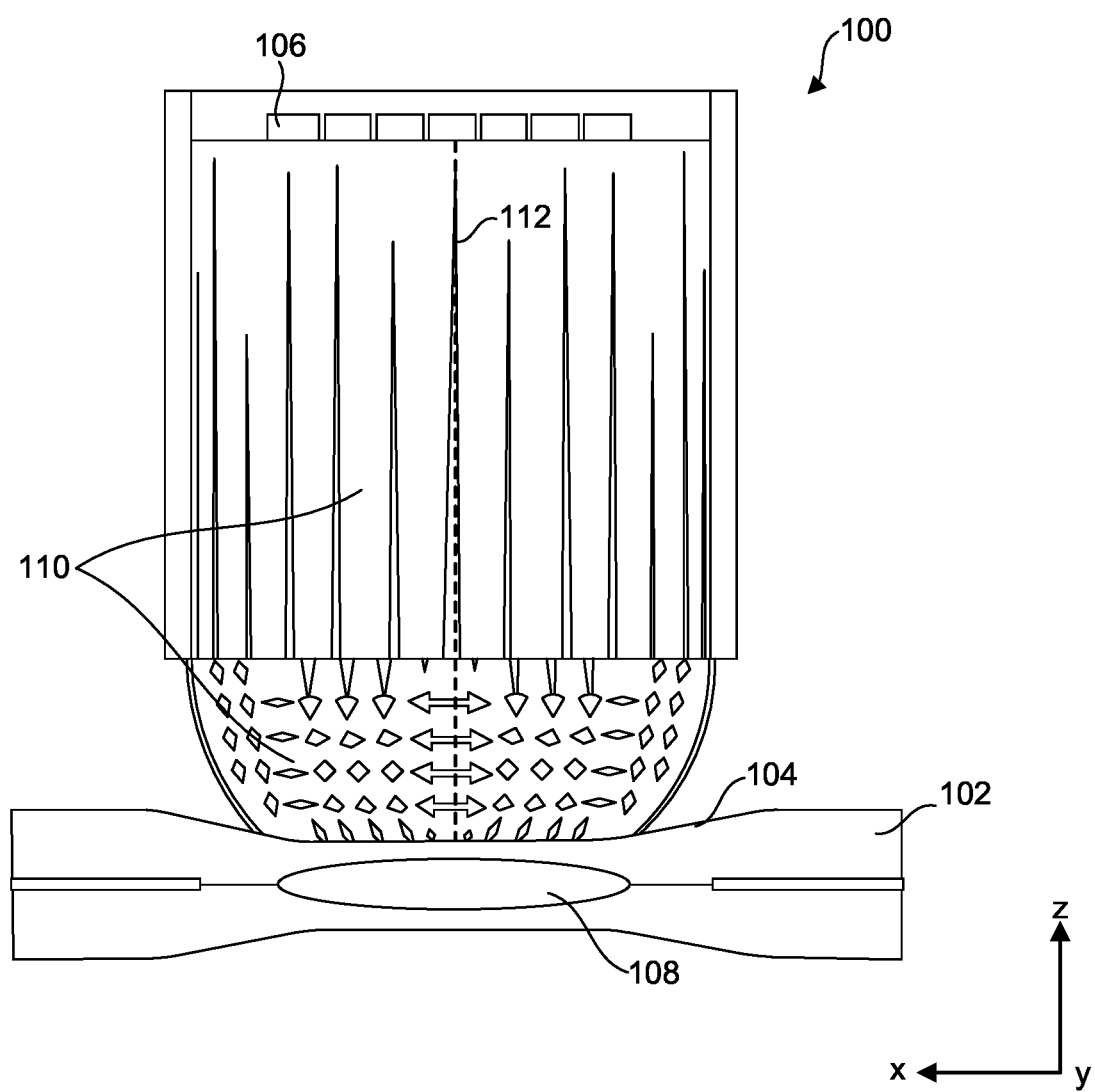
FIG. 1 is a schematic diagram illustrating one exemplary embodiment of an ultrasonic probe including a flexible delay line and a two-dimensional ultrasonic transducer array, where the ultrasonic probe is aligned for normal incidence of emitted ultrasonic signals with a target surface.
Figure 2:
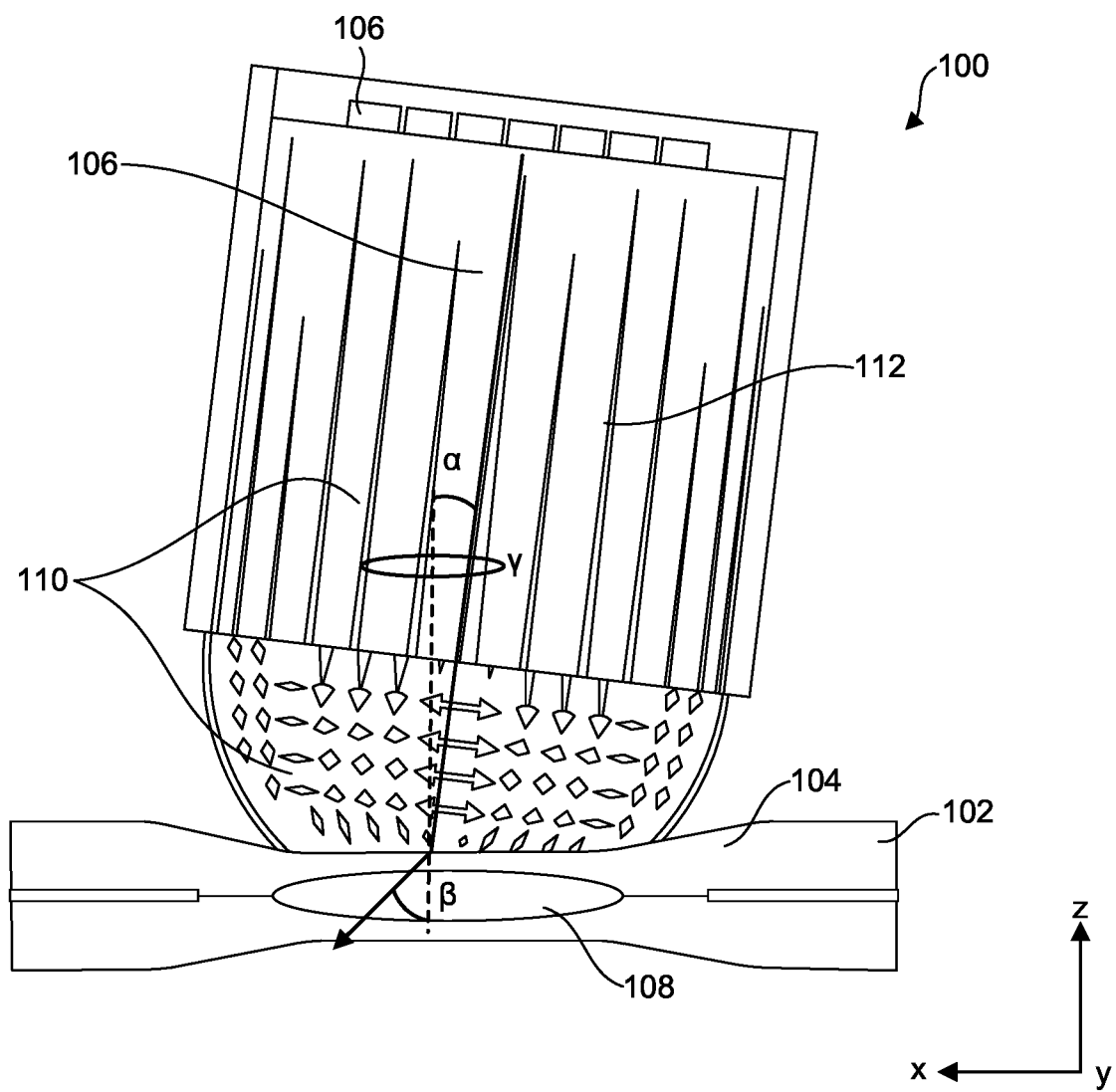
FIG. 2 is a schematic diagram illustrating the ultrasonic probe of FIG. 1, where the ultrasonic probe is tilted away from normal incidence with the target surface.
Figure 3:
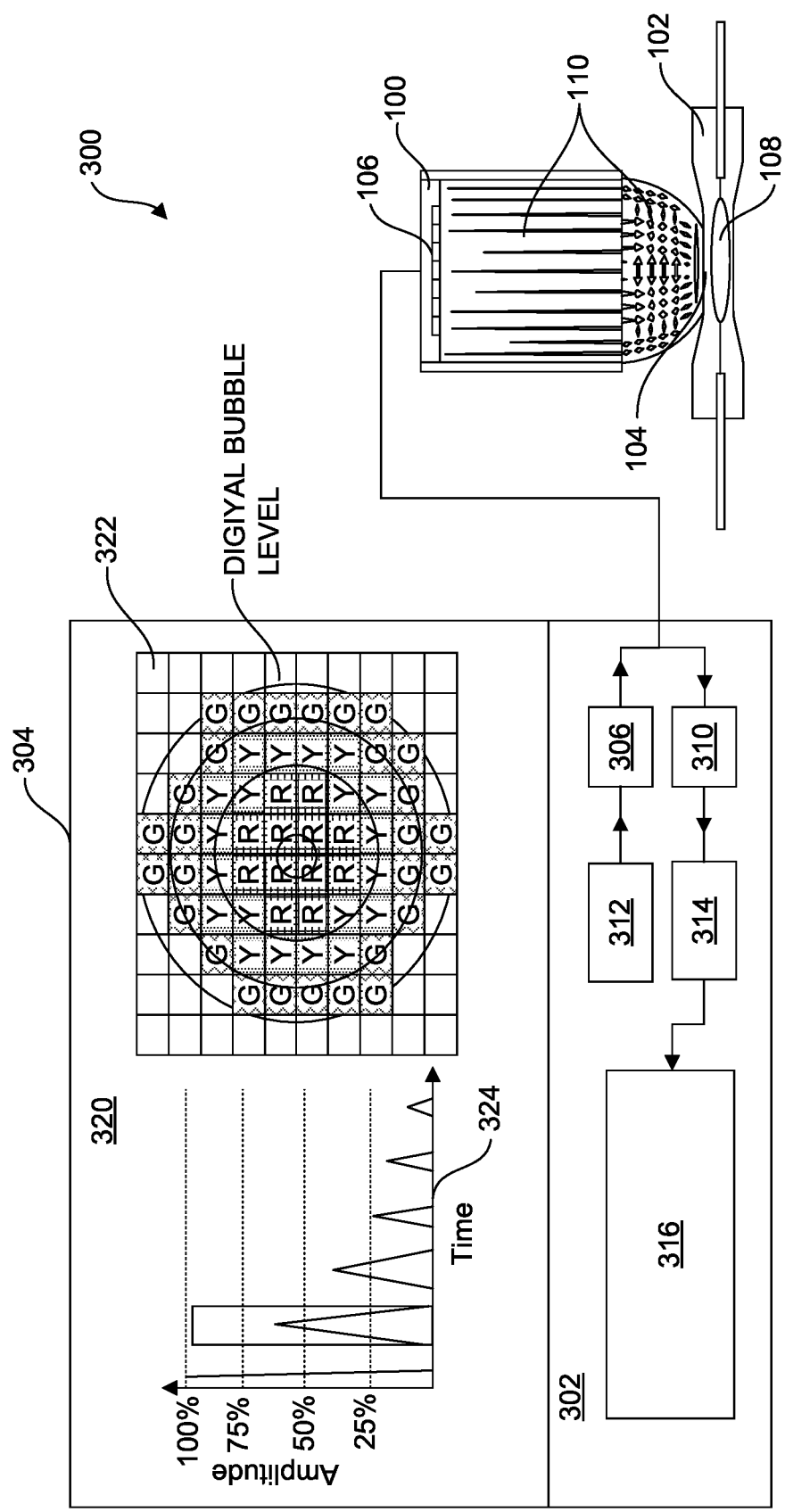
FIG. 3 is a schematic diagram illustrating one exemplary embodiment of an ultrasonic inspection system configured for use with the ultrasonic probe of FIG. 1 to facilitate alignment of the ultrasonic probe with respect to the target surface.

FIG. 3 illustrates one exemplary embodiment of an ultrasonic inspection system 300 including the ultrasonic probe 100 in communication with a processing unit 302 and a display 304. As discussed above, the ultrasonic probe 100 includes the array of ultrasonic transducers 106 (e.g., a two-dimensional array) and the flexible delay line 110. In certain embodiments, the flexible delay line can be formed from a solid material and exhibits an elastic modulus within the range from about 0.01 GPa to about 0.2 GPa. In further embodiments, the delay line can be formed from a liquid material and exhibits a compression modulus within the range from about 0.8 GPa to about 4.5 GPa. The liquid material can be an ultrasonic couplant.

The processing unit 302 includes a transmitter 306, a receiver 310, a memory 312, an analog to digital converter (ADC) 314, and an analyzer 316. The transmitter 306 can include a pulser (not shown) configured to transmit electrical pulses to the ultrasonic transducers 106 according to a predetermined interrogation scheme. In certain embodiments, the interrogation scheme can be stored in the memory 312, which is in communication with the transmitter 306. The receiver 310 is configured to receive ultrasonic echoes measured by the ultrasonic transducers 106, and can include an amplifier (not shown) configured to adjust a strength of the ultrasonic echoes. The ADC 314 can receive the measured ultrasonic echoes, in an analog form, from the receiver 310 and convert the ultrasonic echoes into corresponding digital signals.

The analyzer 316 is in communication with the ADC 314 and receives the digitized echoes. The analyzer 316 can include one or more processors, and corresponding memory, configured to perform a variety of operations on the digitized echoes. In one aspect, the analyzer 316 can be configured to perform signal processing operations, such as filtering, noise reduction, scaling, etc. In another aspect, the analyzer 316 can be configured to generate and output one or more Graphical User Interfaces (GUIs) 320 for viewing the ultrasonic echoes on the display 304.

In further aspects, the analyzer 316 can be configured to generate the GUIs 320 based upon measured ultrasonic echoes for display to an operator that facilitate alignment of the ultrasonic probe 100 with respect to the target 102. As discussed in greater detail below, the analyzer 316 can generate GUIs 320 that display the amplitude of ultrasonic echoes received by the ultrasonic transducers 106 (amplitude of A-scan 324) in the form of a color-coded C-scan. In general, the amplitude of the ultrasonic echoes will increase as the inclination of the ultrasonic probe 100 (e.g., a beam axis) approaches normal to the surface of the target 102. An operator can move the ultrasonic probe 100 and view changes in the amplitude of the ultrasonic echoes within the C-scan 322 in the GUI 320 to obtain visual feedback. By maximizing the amplitude of received ultrasonic signals, the operator can quickly orient the beam axis of the ultrasonic probe 100 at or near a normal orientation with the surface of the target 102.

In further embodiments, the analyzer 316 can be further configured to provide the operator with guidance as to which direction to move of the ultrasonic probe 100 to achieve normal/near normal orientation between the target surface 104 and the beam axis 112. The time of flight for ultrasonic echoes reflected at the surface of the target 102 can be determined at respective ultrasonic transducers 106. As the speed of sound within the flexible delay line is known, the time of flight can be used to determine the distance of each ultrasonic transducer to the target surface 104. With knowledge of the position of each of the ultrasonic transducers within the array, these distance measurements can be used to determine the inclination (e.g., angles $\alpha$, $\gamma$) of a plane containing the array of ultrasonic transducers 106 with respect to the normal vector to the surface of the target surface 104. When an object representing the angles $\alpha$, $\gamma$ is overlaid upon the C-scan, the operator can readily identify the direction that moves inclination of the ultrasonic probe 100 closer to normal with the target surface 104.

Figure 4:
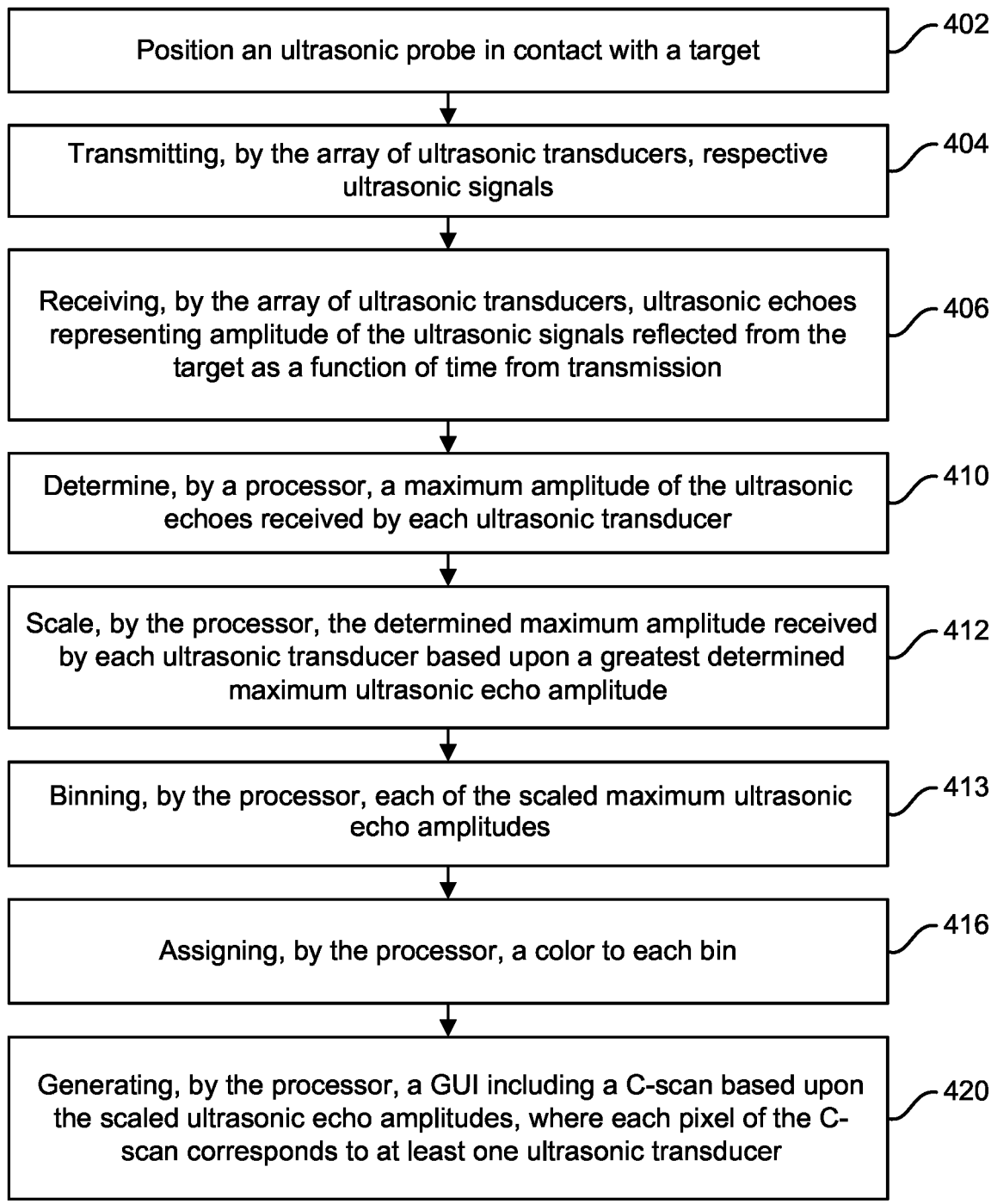
FIG. 4 is a flow diagram illustrating one exemplary embodiment of a method for aligning the ultrasonic probe with respect to the target surface.

FIG. 4 is a flow diagram illustrating one exemplary embodiment of a method 400 for alignment of the ultrasonic probe 100 employing the ultrasonic inspection system 300. As shown, the method includes operations 402-420. Optionally, the method 400 can further include operations 422-432. It can be appreciated, however, that embodiments of the method 400 can include greater or fewer operations than illustrated in FIG. 4 and the operations can be performed in an order different than illustrated in FIG. 4.

In operation 402, the ultrasonic probe 100 is positioned in contact with the target 102. As discussed above, the ultrasonic probe 100 includes the flexible delay line 110 which extends from a first end (e.g., an upper end) to a second end (e.g., a lower end). The array of ultrasonic transducers 106 is positioned at the first end of the flexible delay line 110 and the second end of the flexible delay line contacts the target 102.

In operation 404, the array of ultrasonic transducers 106 transmits respective ultrasonic signals.

In operation 406, the array of ultrasonic transducers receives ultrasonic echoes representing the amplitude of the ultrasonic signals that are reflected from the target 102 as a function of time from transmission.

In operation 410, at least one processor (e.g., the analyzer 316) can determine a maximum amplitude of the ultrasonic echoes that arise due to reflection from the target surface 104 for each ultrasonic transducer of the array of ultrasonic transducers 106. As shown in FIG. 5A, the analyzer 316 can review an A-scan (e.g., A-scan 324a) measured by at least a portion of the ultrasonic transducers 106, and up to all of the ultrasonic transducers within a specific time window to identify the portion of the ultrasonic echo arising due to reflection from the target surface 104. As an example, the analyzer 316 can review the A-scan 324a measured by each of the ultrasonic transducers 106 within a specific time window to identify the portion of the ultrasonic echo arising due to reflection from the target surface 104. An example of a portion of the ultrasonic echo representing a surface reflection is shown in the box 502.

In operation 412, the analyzer 316 can scale the determined maximum ultrasonic echo amplitude received by each of the ultrasonic transducers by a greatest determined maximum ultrasonic echo amplitude.

In operation 414, the analyzer 316 can bin each of the scaled maximum ultrasonic echo amplitudes. As shown in FIG. 5A, the bins 504 can extend from 0 to 1 (or 0 to 100% on a percentage scale). For example, each of the bins can be of equal extent (e.g., 0.1 or 10%). In alternative embodiments, the bins can extend over a portion of the range from 0 to 1/0 to 100%.

In operation 416, a color can be assigned to each bin 504. As shown in FIG. 5A, the following colors are assigned:

White: 0-9%
Blue (B): 10-19% and 20%-29%
Green (G): 30-39%, 40%-49%, 50-59% and 60%-69%
Yellow (Y): 70-79%
Red (R): 80-89% and 90%-100%

In one aspect, the same color can be assigned to multiple bins 504. In other aspects, different colors can be assigned to different bins. Furthermore, reference to specific colors is for illustration purposes and other colors, shades, patterns, or other visibly distinguishable indications can be employed without limit to visually demark respective bins.

Subsequently, the analyzer 316 can generate the GUI 320 that includes a C-scan based upon the scaled ultrasonic echoes. In general the C-scan 322 provides a two-dimensional plan view of the amplitude of the ultrasonic echoes received by the array of ultrasonic transducers 106. Each pixel 506 in the C-scan 322 can represent a single one of the ultrasonic transducers 106 or a group of ultrasonic transducers (e.g., an average value of the amplitude of multiple ultrasonic transducers). The display of pixels 506 in the C-scan 322 corresponds to the position of respective ultrasonic transducers 106 or group of ultrasonic transducers.

In operation 420, the GUI 320 can be rendered within the display 304. FIG. 5B illustrates a C-scan 322a corresponding to the A-scan 324a acquired for the ultrasonic probe 100 at an initial position. As shown, the pixels 506 of the C-scan 322a are colored blue B and green G, corresponding to amplitudes between 10-69%. The pixels 506 having the blue color B surround the pixels 506 having the green color G.

As discussed above, an operator can employ the GUI 320 to obtain feedback on the effect of movement of the ultrasonic probe 100. FIGS. 6A-6B illustrate an A-scan 324b and corresponding C-scan 322b following movement of the ultrasonic probe 100 from the initial position to a first position. As shown, the maximum amplitude corresponding to the ultrasonic echo reflected from the target surface 104 increases in the first position of the ultrasonic probe 100 as compared to the initial position (e.g., ultrasonic echo in box 602 vs. box 502). As further shown in the C-scan 322b acquired at the first position, a majority of the pixels 506 that were blue B in the C-scan 322a acquired at the initial position have become green G, while some of the pixels 506 that were green G in the C-scan 322a acquired at the initial position have become yellow Y.

Figures 7A, 7B:
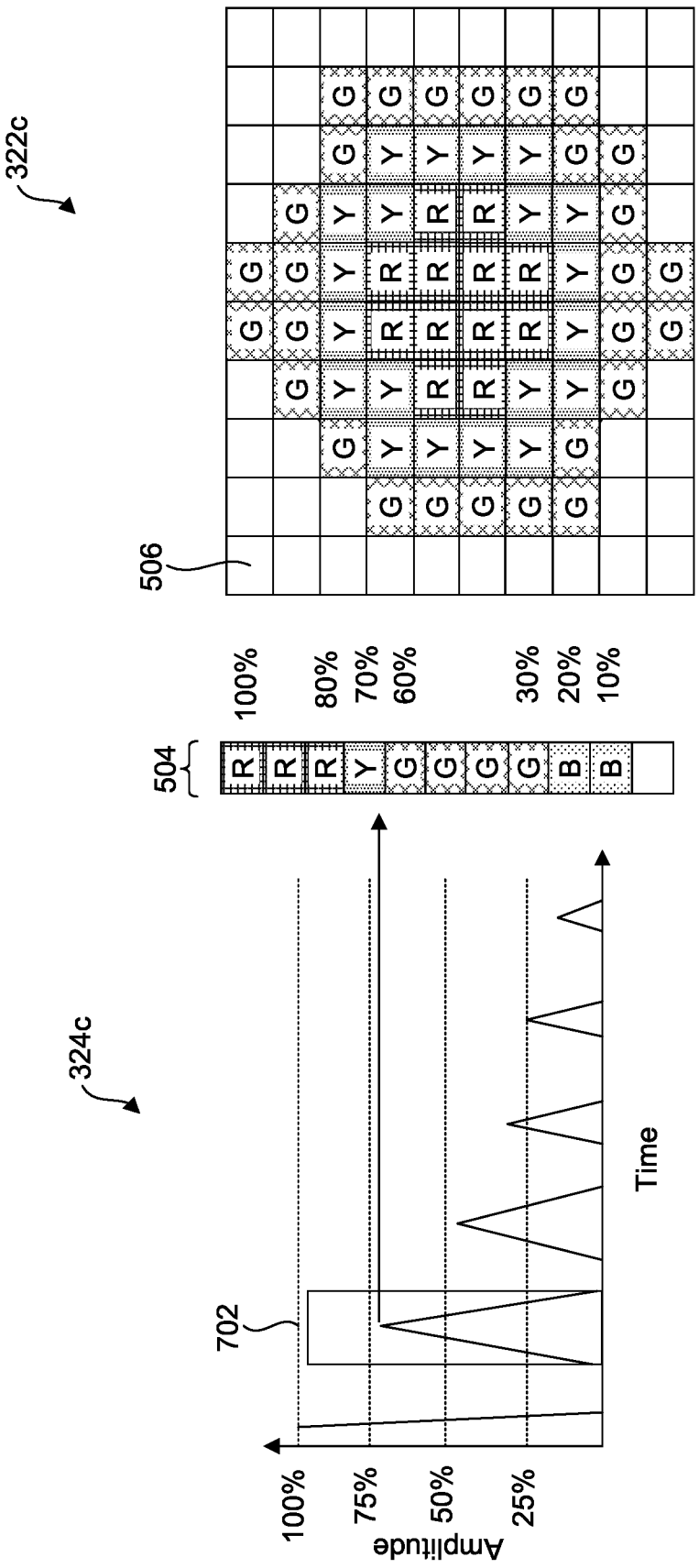
FIG. 7A is a plot illustrating an A-scan of ultrasonic echo amplitude as a function of time for an ultrasonic transducer when the ultrasonic probe is at a second position.
FIG. 7B is a plot illustrating a C-scan of maximum A-scan amplitudes for the array of ultrasonic transducers when the ultrasonic probe is at the initial position.

FIGS. 7A-7B illustrate an A-scan 324c and corresponding C-scan 322c following movement of the ultrasonic probe 100 from the first position to a second position of the ultrasonic probe 100. As shown, the maximum amplitude corresponding to the ultrasonic echo reflected from the target surface 104 increases in the second position of the ultrasonic probe 100 as compared to the first position (e.g., ultrasonic echo in box 702 vs. box 602). As further shown in the C-scan 322c acquired at the second position, some of the pixels 506 that were green G in the C-scan 322b acquired at the first position have become yellow Y, while some of the pixels 506 that were yellow Y in the C-scan 322b acquired at the first position have become red R.

The change of colors from blue to yellow to red as the alignment of the ultrasonic probe is moved from the initial position, through the first position, and to the second position represents increasing amplitude of the ultrasonic echoes. This indicates that the inclination of the ultrasonic probe 100 has moved closer to a normal inclination in the second position as compared to the initial position. Beneficially, the operator can rely entirely on the colored, visual display of the A-scan amplitude within the C-scan 322 for signal optimization, without reference to the A-scan itself.

It can be a challenging task, however, for the operator to determine the direction in which to change the inclination of the ultrasonic probe 100 for signal optimization. Thus, it would be beneficial to provide the operator with further visual display of the angles α and γ to indicate the direction to change the inclination of the ultrasonic probe 100. As discussed in greater detail below, this goal can be achieved using the ultrasonic echoes received at respective ultrasonic transducers 106.

Figure 8:
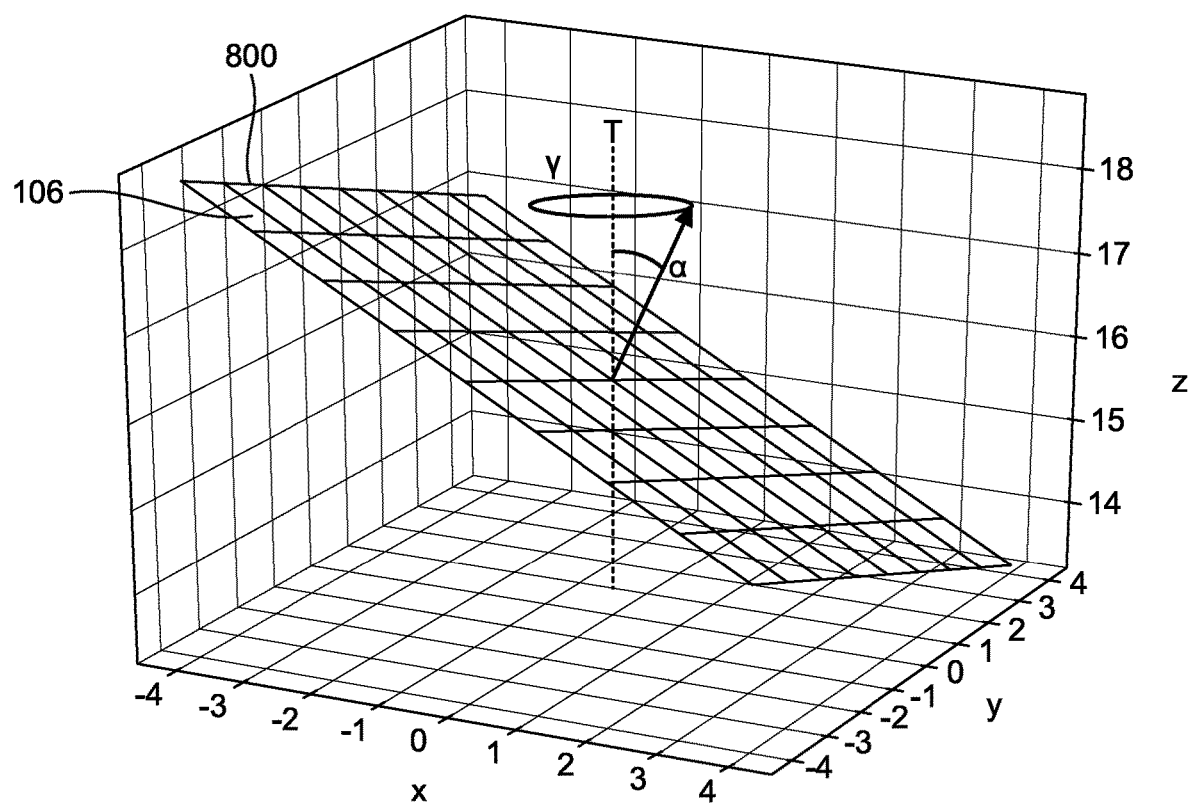
FIG. 8 is a schematic illustration of a plane representing the orientation of the two-dimensional array of ultrasonic transducers.

FIG. 8 is a schematic illustration of a plane 800 representing the orientation of the two-dimensional array of ultrasonic transducers 106. A three-dimensional coordinate grid (x, y, z) is further illustrated for reference. Assume, for the sake of example, that the target surface 104 is parallel to the x-y plane (e.g., the plane extending out of the page). As shown, a surface normal T (dashed line) to the target surface 104 extends straight upwards (e.g., parallel to the z-axis). As discussed above, the surface normal N to the plane 800 is oriented at the angle α to the surface normal T about the y-axis and at the angle γ to the surface normal T about the z-axis. This orientation of the plane 800 can be identified using the ultrasonic echoes received by the ultrasonic transducers 106.

In operation 422 of the ToF 400, the processor can determine a time of flight (ToF) for each received ultrasonic echo corresponding to reflection from the target surface 104 to reach its ultrasonic transducer 106. As discussed above, the A-scan measured by each of the ultrasonic transducers 106 includes the time of flight for the emitted ultrasonic signal to travel to the target surface 104, reflect from the target surface 104, and return to the array of ultrasonic transducers 106 (e.g., box 502, 602, 702). During the time of flight, the ultrasonic signal/ultrasonic echo travels through the flexible delay line 110 at a known speed (e.g., the speed of sound of the material of the flexible delay line 110).

In operation 424, the analyzer 316 can determine the distance of at least a portion of the ultrasonic transducers 106 to the target surface 104 using the measured time of flight and the speed of sound within the flexible delay line 110.

In operation 426, the analyzer 316 can determine, from the ultrasonic transducer distances, a first angle of rotation of the array of ultrasonic transducers (e.g., angle α) about an axis perpendicular to a normal vector to the surface of the target.

In operation 430, the analyzer 316 can determine, from the ultrasonic transducer distances, a second angle of rotation of the array of ultrasonic transducers (e.g., angle γ) about an axis parallel to the normal vector to the surface of the target.

Figure 9:
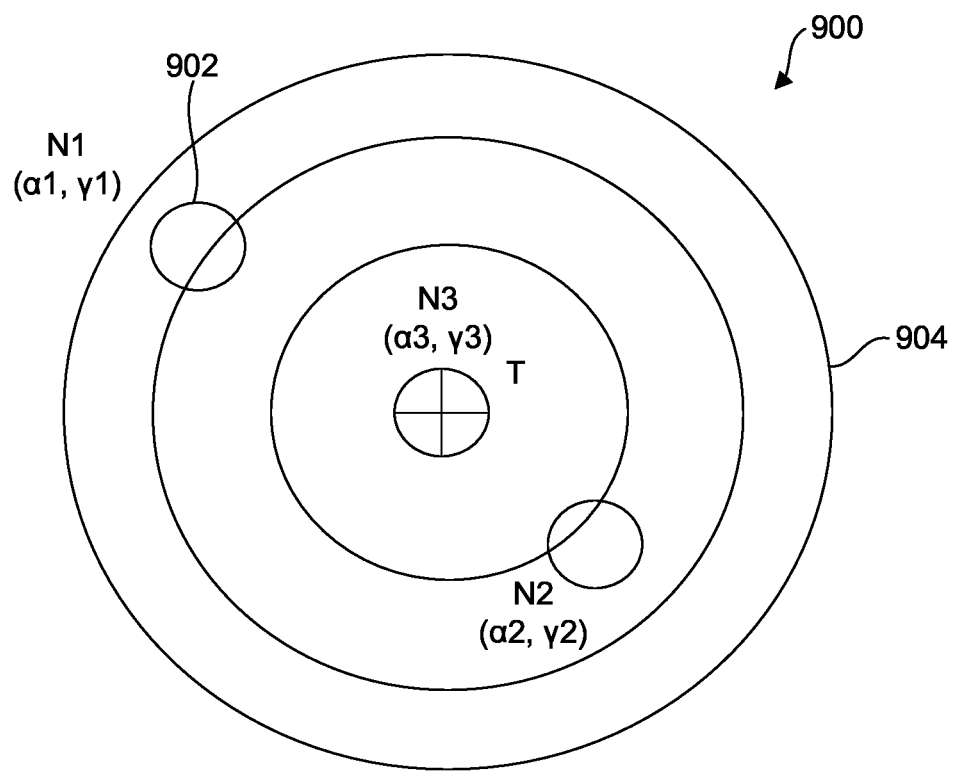
FIG. 9 is a schematic illustration of a projection of different values of a first angle α and the second angle γ, shown as circles, representing a surface normal T to the plane of the array ultrasonic transducers with respect to a surface normal N of the target surface.

FIG. 9 shows a projection 900 of the different values for the first angle α and the second angle γ as circles 902 with respect to the surface normal N, in a simple and intuitive display. As shown, the first angle α represents the radial distance from the surface normal T, shown as a centered cross mark. The second angle γ represents the angular position. This representation can be considered analogously to a water bubble, where placement of a circle (α, γ) at about the center represents alignment of the surface normal N of the plane 800 of the ultrasonic transducers 106 with the surface normal T of the target surface 104. To facilitate alignment of the ultrasonic probe 100, the projection 900 can be combined with the C-scan 322.

As an example, in operation 432, the analyzer 316 can update the GUI 320 to display an object (e.g., circle 902) overlaid upon the C-scan 322 at a location defined by the first angle α and the second angle γ. In alternative embodiments, the projection 900 can be displayed in a corner of the C-scan 322.

In further embodiments, the projection 900 can include concentric circles 904 centered about the surface normal T. Displaying the concentric circles 904 as part of an overlay upon the C-scan 322 can additionally help the operator correctly position the ultrasonic probe 100 in the x- and y-directions.

Figure 10A:
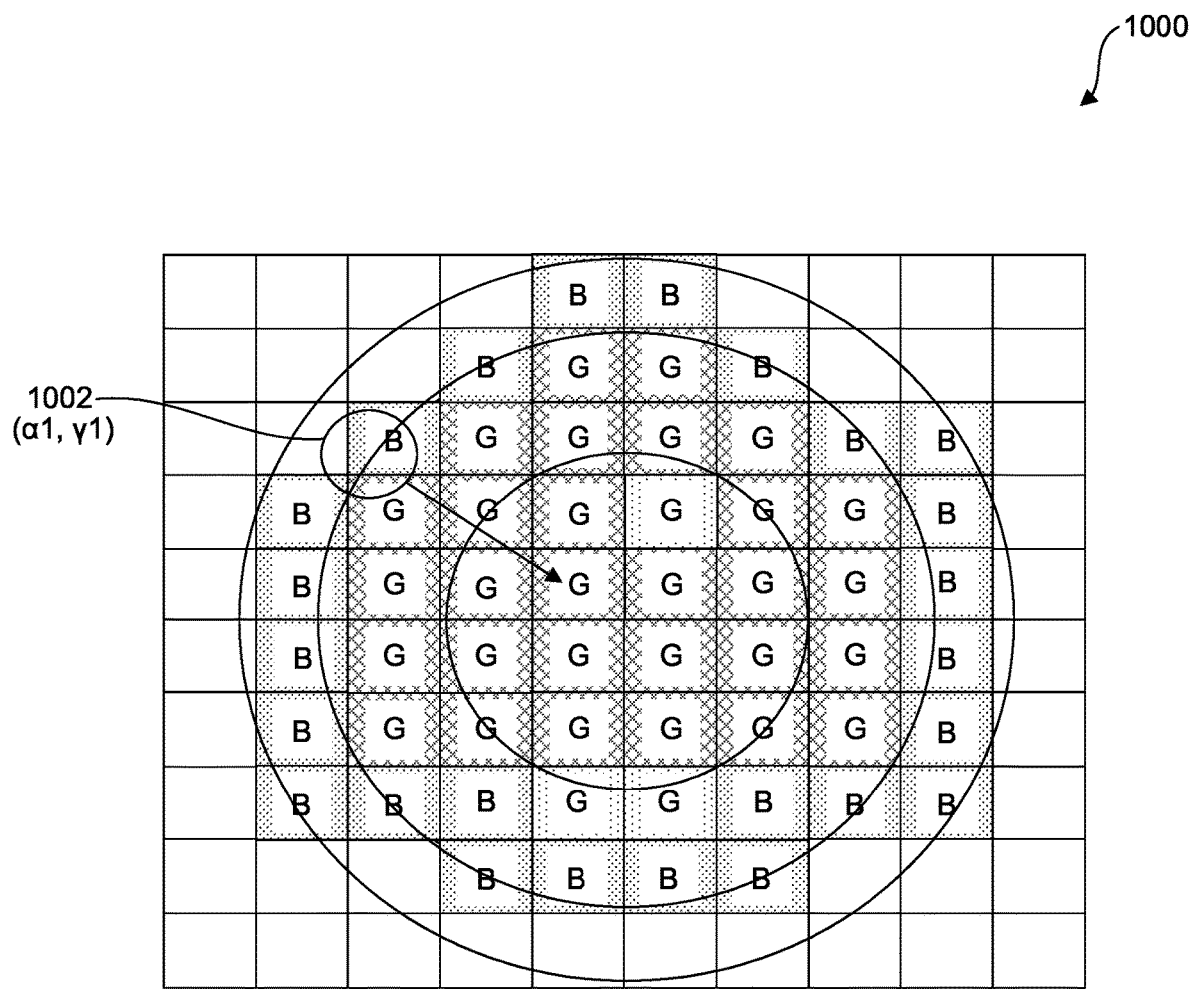
FIG. 10A is a schematic illustration combining the C-scan of FIG. 5A with the first angle α and the second angle γ (α1, γ1) at the initial position of the ultrasonic probe.
Figure 10B:
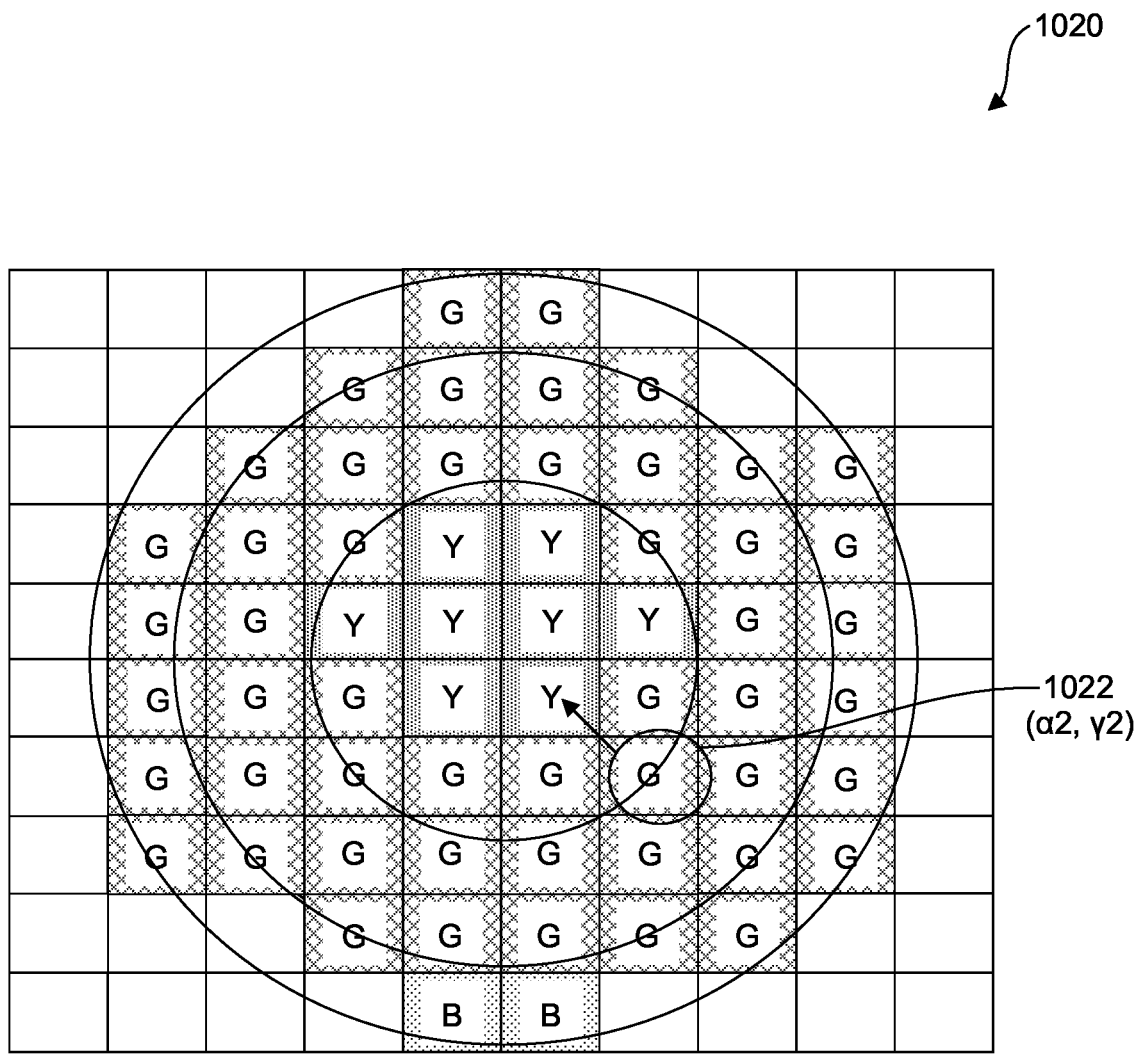
FIG. 10B is a schematic illustration combining the C-scan of FIG. 6A with the first angle α and the second angle γ (α2, γ2) at the first position of the ultrasonic probe.
Figure 10C:
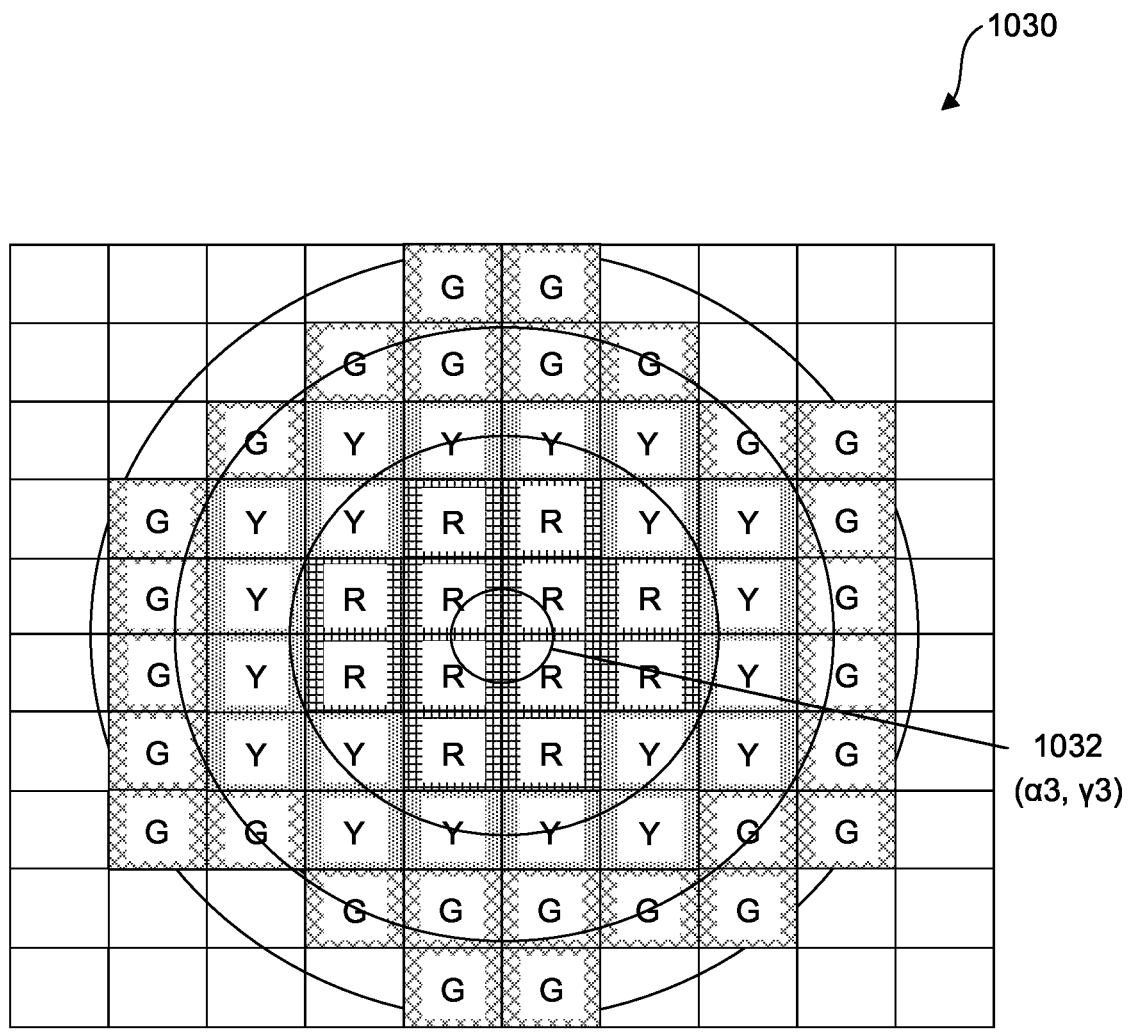
FIG. 10C is a schematic illustration combining the C-scan of FIG. 7A with the first angle α and the second angle γ (α3, γ3) at the second position of the ultrasonic probe.

FIGS. 10A-10C present plots 1000, 1020, 1030, respectively, illustrating combinations of projections 900 corresponding C-scans 322. Plot 1000 combines a projection of angles ($\alpha 1, \gamma 1$) 1002 with corresponding C-scan 322a for the initial position of the ultrasonic probe 100, while plot 1020 combines a projection of angles ($\alpha 2, \gamma 2$) 1022 with corresponding C-scan 322b for the first position of the ultrasonic probe 100, and plot 1030 combines a projection of angles ($\alpha 2, \gamma 2$) 1032 with corresponding C-scan 322c for the second position of the ultrasonic probe 100. As noted above, when the ultrasonic probe 100 is moved from the initial position, through the first position, to the second position, the displayed amplitude increases, indicating that the ultrasonic probe alignment becomes closer to normal with the target surface 104.

The operator, when viewing the plot 1000, can intuitively understand that movement of the ultrasonic probe 100 from the initial position to urge the circle 1002 representing ($\alpha 1, \gamma 1$) 1002 towards the center of the plot 1000 (e.g., down and right), as shown by the arrow can provide signal optimization (e.g., increased amplitude).

This movement places the ultrasonic probe 100 in the first position. When viewing the plot 1020 resulting from such movement, the operator can see improvement in the amplitude, as compared to the initial position, but can further understand that additional optimization is possible, as the circle representing ($\alpha 2, \gamma 2$) 1022 is not centered. Thus, the operator can move the ultrasonic probe 100 to urge the circle towards the center of the plot 1020 (e.g., up and left), as shown by the arrow.

This movement places the ultrasonic probe 100 in the second position. When viewing the plot 1030 resulting from such movement, the operator can see improvement in the amplitude, as compared to the first position and further recognize that optimization is complete, as the circle representing ($\alpha 3, \gamma 3$) 1032 is centered. Thus, the operator can cease further movement of the ultrasonic probe 100 and secure the ultrasonic probe 100 in place at the second position.

Exemplary technical effects of the methods, systems, and devices described herein include, by way of non-limiting example improved systems and methods for aligning ultrasonic probes. The disclosed embodiments can employ measured ultrasonic echoes that represent reflection of ultrasonic waves from the surface of a target. In one aspect, color-coded ultrasonic C-scans of amplitude can be generated and displayed to facilitate finding optimal inclination alignment of the ultrasonic probe. Beneficially, with such C-scans, an operator does not need to review the A-scan for signal optimization. In another aspect, a simple and intuitive display of the direction in which to optimize the probe alignment in the form of a "water-bubble" like graphic can be overlaid upon the C-scans.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method of aligning an ultrasonic probe, comprising:
   positioning an ultrasonic probe in contact with a target, the ultrasonic probe including a flexible delay line extending from a first end to a second end and an array of ultrasonic transducers positioned at the first end of the flexible delay line, wherein the second end of the flexible delay line contacts the target;
   transmitting, by the array of ultrasonic transducers, respective ultrasonic signals;
   receiving, by the array of ultrasonic transducers, ultrasonic echoes representing amplitude of the ultrasonic signals reflected from the target as a function of time from transmission;
   determining, by a processor, a maximum amplitude of the ultrasonic echoes received by each ultrasonic transducer;
   scaling, by the processor, the determined maximum amplitude received by each ultrasonic transducer based upon a greatest determined maximum ultrasonic echo amplitude;
   binning, by the processor, each of the scaled maximum ultrasonic echo amplitudes;
   assigning, by the processor, a color to each bin;
   generating, by the processor, a Graphical User Interface (GUI) including a C-scan based upon the scaled ultrasonic echo amplitudes, wherein each pixel of the C-scan corresponds to at least one ultrasonic transducer, wherein the relative position of each pixel of the C-scan corresponds to the relative position of the ultrasonic transducer represented by the pixel, and wherein each pixel is displayed with the color assigned to the scaled ultrasonic echo received by the pixel; and
   rendering, within a display, the generated GUI.

2. The method of claim 1, further comprising:
   determining, by the processor, a time of flight for at least a portion of the received ultrasonic echoes corresponding to reflection from the target surface to reach its ultrasonic transducers;
   determining, by the processor, the distance of at least a portion of the ultrasonic transducers to the target surface based on the time of flight of the received ultrasonic echoes and the speed of sound within the flexible delay line;
   determining, by the processor from the ultrasonic transducer distances, a first angle of rotation of the array of ultrasonic transducers about an axis perpendicular to a normal vector to the surface of the target;
   determining, by the processor from the time of flight, a second angle of rotation of the array of ultrasonic transducers about an axis parallel to the normal vector to the surface of the target; and
   updating, by the processor, the GUI to display an object overlaid upon the C-scan at a location defined by the first and second angles.

3. The method of claim 1, wherein the flexible delay line is formed from a solid and has an elastic modulus within the range from about 0.01 GPa to about 0.2 GPa.

4. The ultrasonic probe of claim 1, wherein the flexible delay line is a formed from a liquid and has a compression modulus within the range from about 0.8 GPa to about 4.5 GPa.

5. The ultrasonic probe of claim 4, wherein the liquid is an ultrasonic couplant.

6. An ultrasonic inspection system, comprising:
an ultrasonic probe including a flexible delay line extending from a first end to a second end and an array of ultrasonic transducers positioned at the first end of the flexible delay line, wherein the second end of the flexible delay line contacts the target;
a processing unit including an analyzer having at least one processor configured to:
receive, from the array of ultrasonic transducers, ultrasonic echoes representing amplitude of the ultrasonic signals reflected from the target as a function of time from transmission;
determine a maximum amplitude of the ultrasonic echoes received by each ultrasonic transducer;
scale the determined maximum amplitude received by each ultrasonic echoes based upon a greatest determined maximum amplitude;
bin each of the scaled maximum amplitudes;
assign a color to each bin;
generate a Graphical User Interface (GUI) including a C-scan based upon the scaled ultrasonic echoes, wherein each pixel of the C-scan corresponds to at least one ultrasonic transducer, wherein the relative position of each pixel of the C-scan corresponds to the relative position of the ultrasonic transducer represented by the pixel, and wherein each pixel is displayed with the color assigned to the scaled ultrasonic echo received by the pixel; and
render, within a display, the generated GUI.

7. The system of claim 6, wherein the at least one processor is further configured to
determine a time of flight for at least a portion of the received ultrasonic echo corresponding to reflection from the target surface to reach its ultrasonic transducers;
determine the distance of at least a portion of the ultrasonic transducers to the target surface based on the time of flight of the received ultrasonic echoes and the speed of sound within the flexible delay line;
determine, from the ultrasonic transducer distances, a first angle of rotation of the array of ultrasonic transducers about an axis perpendicular to a normal vector to the surface of the target;
determine, from the time of flight, a second angle of rotation of the array of ultrasonic transducers about an axis parallel to the normal vector to the surface of the target; and
update the GUI to display an object overlaid upon the C-scan at a location defined by the first and second angles.

8. The system of claim 6, wherein the flexible delay line is formed from a solid and has an elastic modulus within the range from about 0.01 GPa to about 0.2 GPa.

9. The system of claim 6, wherein the flexible delay line is a formed from a liquid and has a compression modulus within the range from about 0.8 GPa to about 4.5 GPa.

10. The system of claim 9, wherein the liquid is an ultrasonic couplant.

11. An ultrasonic inspection system, comprising:
an ultrasonic probe including a flexible delay line extending from a first end to a second end and an array of ultrasonic transducers positioned at the first end of the flexible delay line, wherein the second end of the flexible delay line contacts the target;
a processing unit including an analyzer having at least one processor configured to:
receive, from the array of ultrasonic transducers, ultrasonic echoes representing amplitude of the ultrasonic signals reflected from the target as a function of time from transmission;
determine a time of flight for at least a portion of the received ultrasonic echoes corresponding to reflection from the target surface to reach its ultrasonic transducers;
determine the distance of at least a portion of the ultrasonic transducers to the target surface based on the time of flight of the received ultrasonic echoes and the speed of sound within the flexible delay line;
determine, from the ultrasonic transducer distances, a first angle of rotation of the array of ultrasonic transducers about an axis perpendicular to a normal vector to the surface of the target;
determine, from the time of flight, a second angle of rotation of the array of ultrasonic transducers about an axis parallel to the normal vector to the surface of the target; and
update the GUI to display an object overlaid upon the C-scan at a location defined by the first and second angles.

12. The system of claim 11, wherein the flexible delay line is formed from a solid and has an elastic modulus within the range from about 0.01 GPa to about 0.2 GPa.

13. The system of claim 11, wherein the flexible delay line is a formed from a liquid and has a compression modulus within the range from about 0.8 GPa to about 4.5 GPa.

14. The system of claim 13, wherein the liquid is an ultrasonic couplant.

15. A method of aligning an ultrasonic probe, comprising:
positioning an ultrasonic probe in contact with a target, the ultrasonic probe including a flexible delay line extending from a first end to a second end and an array of ultrasonic transducers positioned at the first end of the flexible delay line, wherein the second end of the flexible delay line contacts the target;
transmitting, by the array of ultrasonic transducers, respective ultrasonic signals;
receiving, by the array of ultrasonic transducers, ultrasonic echoes representing amplitude of the ultrasonic signals reflected from the target as a function of time from transmission;
determining, by a processor, a time of flight for at least a portion of the received ultrasonic echoes corresponding to reflection from the target surface to reach its ultrasonic transducers;
determining, by the processor, the distance of at least a portion of the ultrasonic transducers to the target surface based on the time of flight of the received ultrasonic echoes and the speed of sound within the flexible delay line;
determining, by the processor from the ultrasonic transducer distances, a first angle of rotation of the array of ultrasonic transducers about an axis perpendicular to a normal vector to the surface of the target;
determining, by the processor from the time of flight, a second angle of rotation of the array of ultrasonic transducers about an axis parallel to the normal vector to the surface of the target; and
updating, by the processor, the GUI to display an object overlaid upon the C-scan at a location defined by the first and second angles.

16. The method of claim 15, wherein the flexible delay line is formed from a solid and has an elastic modulus within the range from about 0.01 GPa to about 0.2 GPa.

17. The method of claim 15, wherein the flexible delay line is a formed from a liquid and has a compression modulus within the range from about 0.8 GPa to about 4.5 GPa.

18. The method of claim 17, wherein the liquid is an ultrasonic couplant.

\* \* \* \* \*